(12) United States Patent
Thukral (10) Patent No.: US 7,703,114 B2
(45) Date of Patent: Apr. 20, 2010

(54) TELEVISION SYSTEM TARGETED ADVERTISING

(75) Inventor: Vivek Thukral, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1039 days.

(21) Appl. No.: 11/065,957

(22) Filed: Feb. 25, 2005

(65) Prior Publication Data

US 2006/0195866 A1    Aug. 31, 2006

(51) Int. Cl.
*H04N 7/10* (2006.01)
*G06F 3/00* (2006.01)
*H04N 7/20* (2006.01)
*H04N 7/173* (2006.01)
*H04N 7/16* (2006.01)

(52) U.S. Cl. .............................. 725/34; 725/36; 725/68; 725/85; 725/110; 725/139; 725/151

(58) Field of Classification Search ............. 725/32–36, 725/9–21, 37–61, 68, 85, 100, 110, 131, 725/139, 151
See application file for complete search history.

(56) References Cited

U.S. PATENT DOCUMENTS

| | | | |
|---|---|---|---|
| 6,182,050 B1 * | 1/2001 | Ballard ........................ | 705/14 |
| 6,738,978 B1 * | 5/2004 | Hendricks et al. ............. | 725/35 |
| 7,328,448 B2 * | 2/2008 | Eldering et al. ............... | 725/32 |
| 2002/0032906 A1 * | 3/2002 | Grossman ..................... | 725/42 |
| 2002/0083435 A1 * | 6/2002 | Blasko et al. ................. | 725/14 |
| 2002/0124182 A1 * | 9/2002 | Bacso et al. ................ | 713/200 |
| 2003/0093789 A1 * | 5/2003 | Zimmerman et al. .......... | 725/34 |
| 2003/0110499 A1 * | 6/2003 | Knudson et al. .............. | 725/42 |

\* cited by examiner

*Primary Examiner*—Christopher Kelley
*Assistant Examiner*—Alazar Tilahun
(74) *Attorney, Agent, or Firm*—Lee & Hayes, PLLC (57) ABSTRACT

Television system targeted advertising is described. In an embodiment, a content provider monitors a real-time state of television-based systems for a power on/off state and a tuning configuration. The content provider delivers advertising content to one or more of the television-based systems when they are powered-on and configured to receive the advertising content. The one or more television-based systems then receive the advertising content to display a targeted advertisement for viewing. The content provider records how many of the television-based systems receive the advertising content, and records how many of the television-based systems that receive the advertising content then display the targeted advertisement for viewing.

10 Claims, 10 Drawing Sheets

TELEVISION SYSTEM TARGETED ADVERTISING

TECHNICAL FIELD

This invention relates to targeted advertising systems and methods.

BACKGROUND

For broadcast television, it is difficult to measure or qualify the impression that an advertisement has on viewers who see the advertisement. Typically, advertisements are inserted into television channels that are broadcast globally to subscribers of a television service. Additionally, global advertisements can be replaced with region specific advertisements for local advertising to viewers of a particular region. However, there is no guarantee that region specific advertisements targeted to a particular subscriber group are actually watched by the viewers of the group. Subscriber television devices may not be powered on to receive the advertisements when they are delivered, or the television devices may be powered on but tuned to a television channel other than the one over which a targeted advertisement is delivered.

Advertisers typically rely on marketing assumptions based on historical data, such as historical logs of subscriber device inputs, to provide an approximate measure of advertising impressions on viewers. Targeted advertisements are delivered to a particular group having viewers that are more likely to buy an advertised product or service. Television service providers desire information about targeted advertisement impressions because targeted advertisements can command a premium price for their delivery to a targeted subscriber group. However, the current methods of targeted advertisement tracking only provide post-device state information, such as the number of subscriber television devices that were powered on to receive a targeted advertisement. These types of advertisement impressions after the fact do not provide enough of a basis to deliver the targeted advertisements and/or to command a premium price for the delivery of the advertisements from advertisers wanting to target viewers that are most likely to purchase a product or service.

SUMMARY

Television system targeted advertising is described herein.

In an implementation of television system targeted advertising, a content provider monitors a real-time state of television-based systems for a power on/off state and a tuning configuration. The content provider delivers advertising content to one or more of the television-based systems when they are powered-on and tuned to receive the advertising content. The one or more television-based systems then receive the advertising content to display a targeted advertisement for viewing. The content provider records how many of the television-based systems receive the advertising content, and records how many of the television-based systems that receive the advertising content then display the targeted advertisement for viewing.

BRIEF DESCRIPTION OF THE DRAWINGS

The same numbers are used throughout the drawings to reference like features and components.

DETAILED DESCRIPTION

Television system targeted advertising is provided to deliver advertisements to a targeted subscriber group based on a real-time state of the subscribers' television system client devices. This enables advertisers, via television service providers, to target subscribers with state-based custom advertisements that are likely to be more effective than just broadcast advertising. A content provider, such as a cable company headend service, maintains the real-time state of the subscriber devices via an IP-based network. The real-time state of a subscriber television system client device includes, for example, the power on/off state of the device and channel tuning information, such as which channel(s) the device is tuned to when a targeted advertisement is delivered.

Targeted advertisement(s) can be delivered as advertising content via an in-band transport or via an out-of-band transport of a broadcast network. The advertising content can also be delivered along with a system state request that is communicated from a service provider to a television-based system as part of the real-time state monitoring. Additionally, the advertising content can be delivered based on delivery criteria, such as a scheduled date, a scheduled time, and/or a scheduled recursive interval. The advertising content can also be delivered based on a detected state change of a television system client device, or in response to a request from a television system client device to receive the advertising content. The latter two delivery criteria ensures that a subscriber is likely watching the targeted advertisement that is being received and displayed for viewing.

A service provider can record how many of the television-based systems receive the advertising content, and record how many of the television-based systems that receive the advertising content then display the targeted advertisement for viewing. Additionally, the service provider can record how many of the television-based systems that receive the advertising content and display the targeted advertisement for viewing then initiate a response to the targeted advertisement. From this recorded data, the service provider can generate an advertising report that provides an accurate and consistent measurement of an advertisement impression.

While aspects of the described systems and methods for television system targeted advertising can be implemented in any number of different computing systems, environments, and/or configurations, embodiments of television system targeted advertising are described in the context of the following exemplary system architectures.

Figure 1:
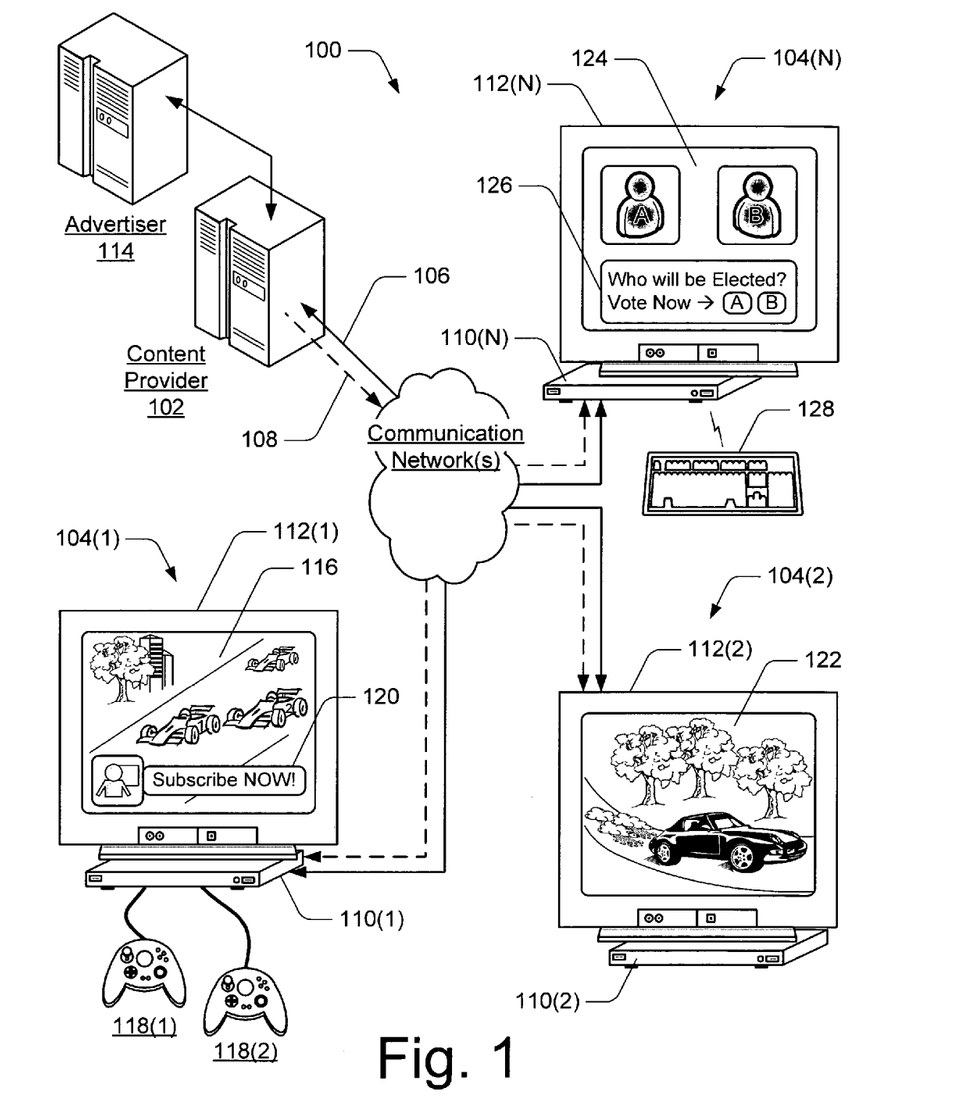
FIG. 1 illustrates an exemplary television-based system in which embodiments of television system targeted advertising can be implemented.

FIG. 1 illustrates an exemplary television-based system 100 in which embodiments of television system targeted advertising can be implemented. The television-based system 100 includes a content provider 102 and any number of television-based client systems 104(1-N). The client systems 104(1-N) are each configured for communication with content provider 102 via a communication network 106 which, in this example, is an IP-based network. The client systems 104(1-N) are also each configured for communication with content provider 102 via a broadcast network 108. The broadcast network 108 can be implemented to include an in-band communication link (e.g., an in-band transport), an out-of-band communication link (e.g., an out-of-band transport), and/or a two-way communication link. The client systems 104(1-N) receive program content, program guide data, advertising content, and the like from content server(s) of the content provider 102 via the IP-based network 106 and/or via the broadcast network 108.

Content provider 102 and/or the television-based client systems 104(1-N) may be implemented with any number and combination of differing components as further described below with reference to the exemplary computing and/or client device 900 shown in FIG. 9. Further, the television-based system 100 may be implemented with any number and combination of differing components as described below with reference to the exemplary computing environment 1000 shown in FIG. 10.

The television-based client system 104(1) includes a client device 110(1) and a display device 112(1). Similarly, the television-based client systems 104(2-N) include a respective client device 110(2-N) and a respective display device 112(2-N). Each client device 110(1-N) can be implemented in any number of embodiments, such as a set-top box, a digital video recorder (DVR) and playback system, a personal video recorder (PVR), an appliance device, a gaming system, any combination thereof, and as any other type of client device that may be implemented in a television-based entertainment and information system.

The content provider 102 maintains a real-time state of each of the client devices 110(1-N) of the respective television-based systems 104(1-N). A real-time state of a client device 110 can include a power on/off state of the device and a channel tuning configuration of the device, such as channel(s) the device is tuned to when a targeted advertisement is delivered. The content provider 102 receives advertising content from an advertiser 114, and delivers the advertising content as targeted advertising to one or more of the client devices 110(1-N). The content provider 102 leverages the real-time state information which enables the advertiser 114 to effectively target subscribers with state-based custom advertisements that are likely to be more effective than just broadcast advertising.

The advertising content received from advertiser 114 can be any media type, such as audio, text (e.g., a ticker display), an image, a graphic (e.g., a poster), a video clip, and/or any combination thereof, such as an audio-video combination. The client devices 110(1-N) each receive program content, program guide data, and advertising content from server device(s) of content provider 102 to display programs, games, on-demand content, an electronic program guide, and advertisements for viewing. An advertisement can be displayed as a full-screen display, a PIP (picture-in-picture) window, an on-screen display, a ticker display, a static image, an audio message, and/or as any combination thereof.

For example, an on-line interactive game 116 is displayed on display device 112(1) of the television-based client system 104(1), and the gaming is controlled with game controllers 118(1-2). The content provider 102 monitors the state of client device 110(1) and a server of the content provider 102 delivers a targeted advertisement 120 to the subscribers that are playing the game 116. In this example, the targeted advertisement 120 is an on-screen display that conveys a message to join or subscribe to an on-line gaming site, or some other similar gaming-centric advertising, that is likely relevant and of interest to the subscribers that are currently playing the game 116.

A full-screen advertisement 122 is displayed on display device 112(2) of the television-based client system 104(2). The content provider 102 monitors the state of client device 110(2) and delivers the targeted advertisement 122 to viewer(s) that are watching a program. In this example, the viewer(s) may be watching an auto racing event and a sports car company wants to target viewers that would likely be interested in a new sports car model. When the client device 110(2) is tuned to display the auto racing event for viewing, a server of the content provider 102 delivers advertising content to the client device 110(2) to display the targeted advertisement 122 for viewing.

An advertisement 124 is displayed on display device 112(N) of the television-based client system 104(N). In this example, the content provider 102 monitors the state of client device 110(N) and delivers the targeted advertisement 124 to a subscriber that is watching a news program that includes a discussion about an upcoming election. The news station airing the news program wants to target viewers that would likely provide a response to a real-time, interactive election poll. When the client device 110(N) is tuned to display the news program for viewing, a server of the content provider 102 delivers advertising content to the client device 110(N) to display the targeted advertisement 124 for viewing. The advertisement 124 includes an interactive poll 126 about two candidates for election, and a viewer can respond with an interactive input from an input device, such as keyboard 128 or another similar input or pointing device.

Targeted advertisements can be delivered as advertising content via an in-band transport or via an out-of-band transport of the broadcast network 108. The advertising content can also be delivered via the IP-based network 106 along with a system state request that is communicated from content provider 102 to a client device 110 of a respective television-based system 104 as part of the real-time state monitoring. Additionally, the advertising content can be delivered to a client device 110 based on delivery criteria, such as a scheduled date, a scheduled time, and/or a scheduled recursive interval. The advertising content can also be delivered based on a detected state change of a client device 110, or in response to a request from a client device 110 to receive the advertising content. The latter two delivery criteria ensures that a subscriber is likely watching the targeted advertisement that is being received and displayed for viewing.

The content provider 102 can generate an advertising report for the advertiser 114 that provides accurate advertising data and consistent measurements of an advertisement impression. For example, the content provider can record how many client devices 110(1-N) of respective television-based systems 104(1-N) receive the advertising content, and record how many of the client devices 110(1-N) that receive the advertising content then display a targeted advertisement for viewing.

Additionally, the content provider 102 can record how many of the client devices 110(1-N) that receive the advertising content and display a targeted advertisement for viewing then initiate a response to the targeted advertisement. With the targeted advertisement 124 shown on display 112(N) of the television-based system 104(N), the content provider 102 can not only determine how many client devices 110 receive the advertisement 124 and display the advertisement for viewing, the content provider 102 can also monitor how many subscribers respond to the advertisement 124, and can monitor what the response(s) are to provide accurate reporting statistics. The advertisement impressions qualified in an advertising report provide per delivery and cumulative advertising data which is accurate, and which the advertiser 114 can use as a basis to schedule the delivery of additional advertising content.

Figure 2:
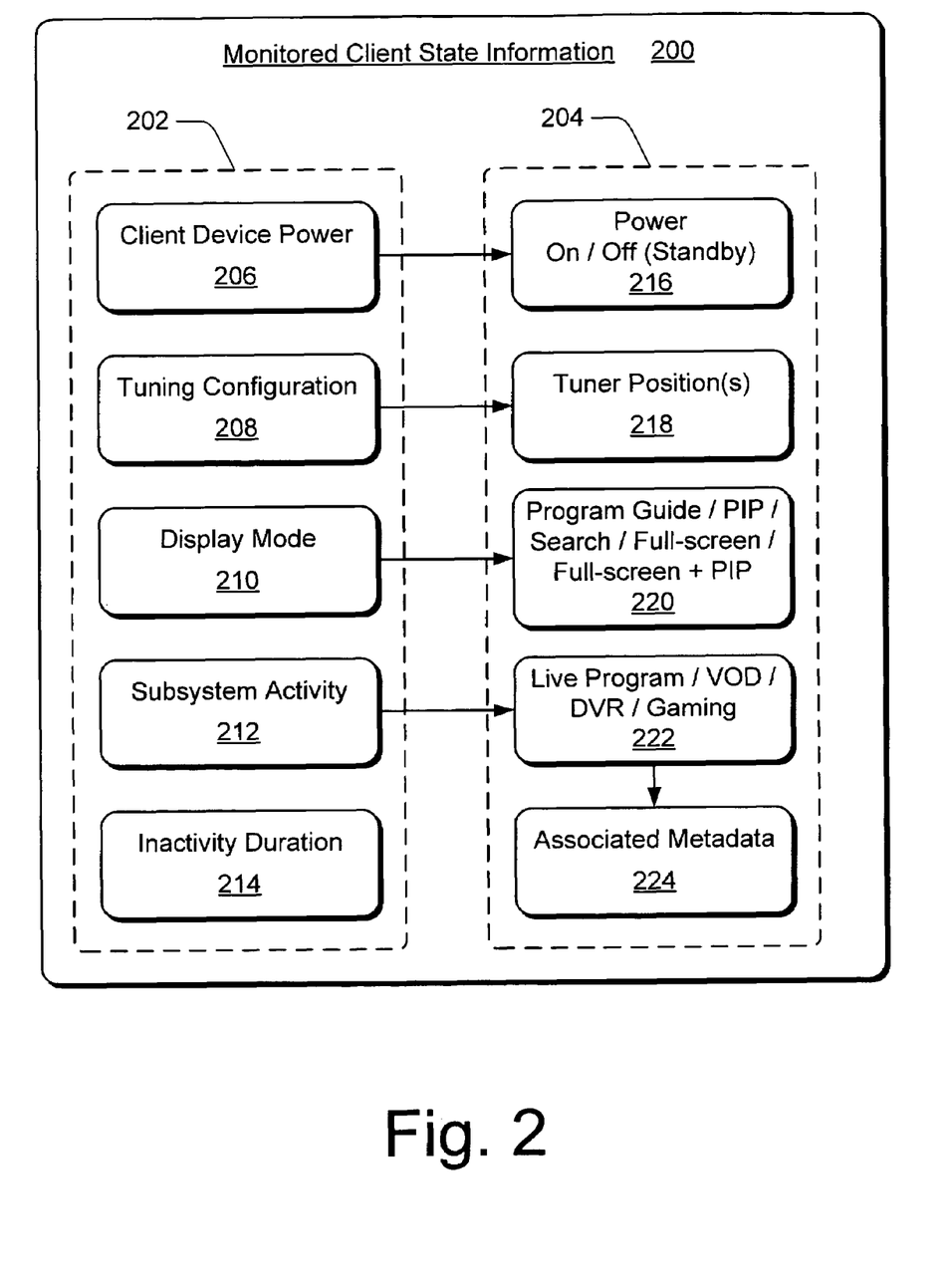
FIG. 2 illustrates an example of monitored client state information for a television-based system, and is described with reference to the television-based system shown in FIG. 1.

FIG. 2 illustrates an example of monitored client state information 200 for a television-based client device, such as a client device 110 of a television-based system 104 described with reference to the exemplary television-based system 100 shown in FIG. 1. The content provider 102 monitors the client devices 110(1-N) of the respective television-based systems 104(1-N) to maintain a real-time state of each of the client devices 110(1-N). The content provider 102 can poll each of the client devices 110(1-N) on a scheduled interval to obtain the client state information.

The monitored client state information 200 includes states 202 of a client device 110 and corresponding state conditions 204. In this example, the states 202 include client device power 206, tuning configuration 208, display mode 210, subsystem activity 212, and/or any other client device state information monitored by a content provider, such as an inactivity duration 214.

The client device power state 206 corresponds to state conditions 216 that include power-on, power-off, and standby. The tuning configuration 208 corresponds to tuner position(s) 218 (e.g., a client device may have more than one tuner). The display mode state 210 corresponds to any number of state conditions 220 that indicate the television-based system is displaying a program guide, a search screen, a full-screen, a PIP, a full-screen and PIP combination, and/or any combination thereof. The subsystem activity state 212 corresponds to any number of state conditions 222 that indicate the television-based system is displaying live programming, an on-demand video (VOD), a recorded program via the DVR, a gaming application, and/or any combination thereof. Additionally, the subsystem activity state conditions 222 can have associated metadata 224 to further identify the display content, such as movie metadata to describe an on-demand video.

The monitored client state information 200 provides an indication about viewer, or subscriber activity, such as what a viewer is watching and on what channel, or whether a viewer is watching recorded programming. Additionally the monitored client state information 200 provides an indication about whether a viewer is participating in on-line gaming, instant messaging, or some other form of viewer interaction or activity.

The inactivity duration 214 can also provide information to determine whether a viewer is still watching a television. Often a viewer will leave a television on to display programming content, yet not be watching the program or even be in the same room. The inactivity duration 214 can be set, canceled, and/or reset for each detected indication that a viewer is or is not present and watching television, such as a screen saver being initiated, a channel change input or program guide viewing input, a gaming input, a communication input, any such voice-based inputs, and other similar viewer inputs that would indicate the presence of a viewer watching television.

Figure 3:
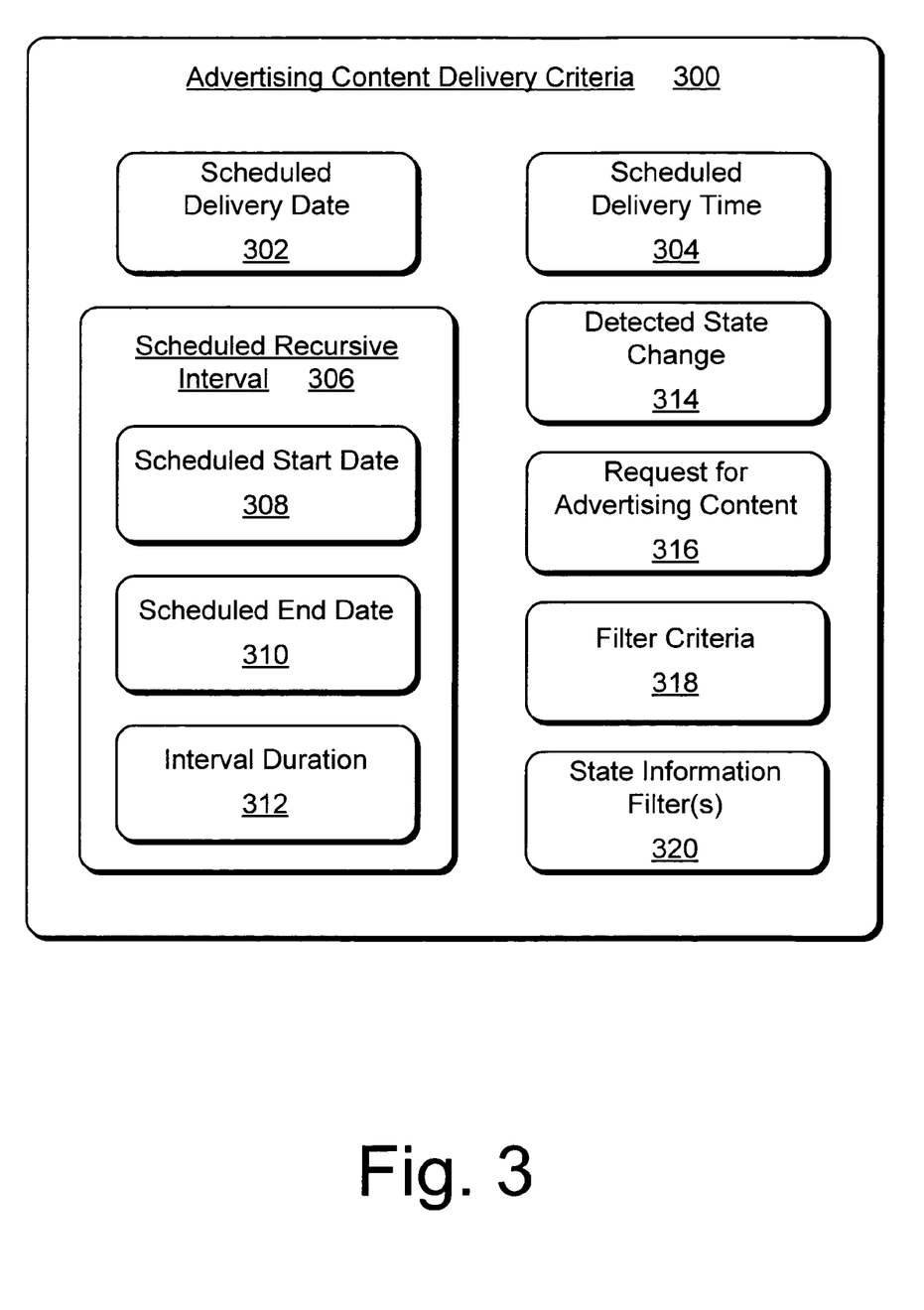
FIG. 3 illustrates an example of advertising content delivery criteria maintained for television system targeted advertising, and is described with reference to the television-based system shown in FIG. 1.

FIG. 3 illustrates an example of advertising content delivery criteria 300 for television system targeted advertising and is described with reference to the exemplary television-based system 100 shown in FIG. 1. The content provider 102 can receive the targeted advertising criteria 300 along with the advertising content from advertiser 114. The advertising content can be delivered from content server(s) of the content provider 102 to the client devices 110(1-N) of the television-based systems 104(1-N) based on various delivery filters and/or criteria.

The advertising content delivery criteria 300 includes a scheduled delivery date 302, a scheduled delivery time 304, and a scheduled recursive interval 306 that may be based on a scheduled start date 308, a scheduled end date 310, and an interval duration 312 (e.g., once daily, twice weekly, etc.). The advertising content can also be delivered based on advertising content delivery criteria 300 that include a detected state change 314 of a television system client device 110, or in response to a request 316 from a television system client device 110 to receive the advertising content. The latter two delivery criteria ensures that a subscriber is likely watching the targeted advertisement that is being received and displayed for viewing.

The advertising content delivery criteria 300 can also include filter criteria 318, such as which subscribers to deliver the advertising content to, and when to deliver it. The advertising content can also be filtered for delivery based on state information filter(s) 320 that filter the advertising content for delivery based on any one or more of the monitored client states 202 and/or corresponding state conditions 204 described with reference to the monitored client state information 200 shown in FIG. 2.

Figure 4:
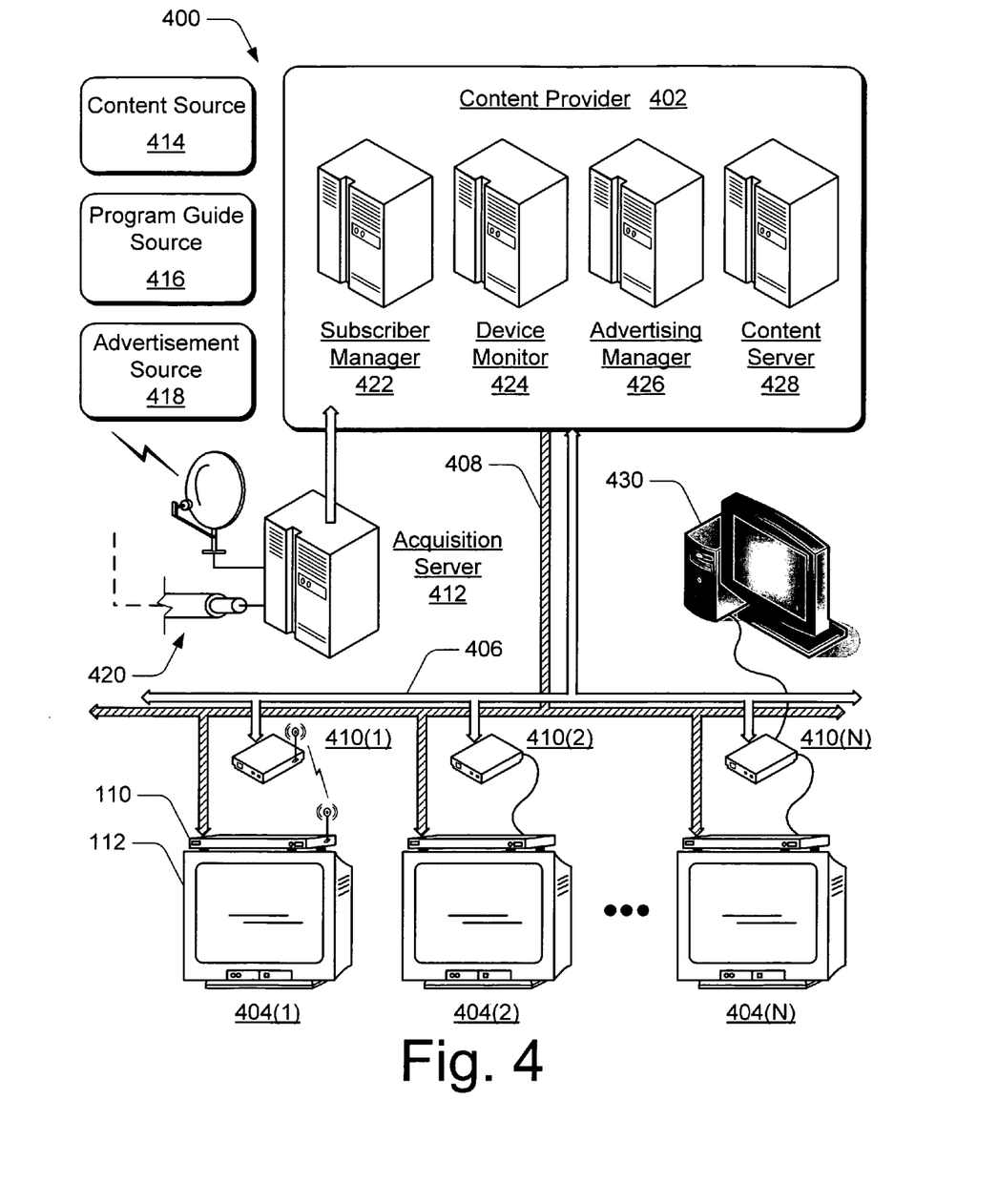
FIG. 4 illustrates various devices and components in an exemplary entertainment and information system in which embodiments of television system targeted advertising can be implemented.

FIG. 4 illustrates an exemplary entertainment and information system 400 in which an IP-based television environment can be implemented, and in which embodiments of television system targeted advertising can be implemented. System 400 facilitates the distribution of program content, program guide data, and advertising content to multiple viewers. System 400 includes a content provider 402 and television-based client systems 404(1-N) each configured for communication via an IP-based network 406 and/or via a broadcast network 408.

The network 406 can be implemented as a wide area network (e.g., the Internet), an intranet, a Digital Subscriber Line (DSL) network infrastructure, or as a point-to-point coupling infrastructure. Additionally, network 406 can be implemented using any type of network topology and any network communication protocol, and can be represented or otherwise implemented as a combination of two or more networks. A digital network can include various hardwired and/or wireless links 410(1-N), routers, gateways, and so on to facilitate communication between content provider 402 and the client systems 404(1-N).

The broadcast network 408 can be implemented to include an in-band communication link (e.g., an in-band transport), an out-of-band communication link (e.g., an out-of-band transport), and/or a two-way communication link. The television-based client systems 404(1-N) receive program content, program guide data, advertising content, and the like from content server(s) of the content provider 402 via the IP-based network 406 and/or via the broadcast network 408.

System 400 includes an acquisition server 412 that receives program content from a content source 414, program guide data from a program guide source 416, and advertising content from an advertisement source 418. The content source 414, the program guide source 416, and the advertisement source 418 control distribution of the program content, the program guide data, and the advertising content to the acquisition server 412 via various transmission media 420, such as satellite transmission, radio frequency transmission, cable transmission, and/or via any number of other transmission media. In this example, acquisition server 412 is shown as an independent component of system 400 that communicates the program content, program guide data, and advertising content to content provider 402. In an alternate implementation, acquisition server 412 can be implemented as a component of content provider 402.

Advertising content includes any form of audio, video, and/or image content that communicates a public service message, or that advertises a product and/or a service. As used herein, "program(s)" and "program content" pertains to news shows, sitcoms, comedies, movies, commercials, talk shows, sporting events, on-demand videos, and any other form of television-based entertainment and information. Further, "recorded programs" include any of the aforementioned "programs" that have been recorded and that are maintained with a memory component as recorded programs, or that are maintained with a remote program data store. The "recorded programs" can also include any of the aforementioned "programs" that have been recorded and that are maintained at a broadcast center and/or at a headend that distributes the recorded programs to subscriber sites and to the client systems 404(1-N).

Content provider 402 is representative of a headend service in a television-based content distribution system, for example, that provides the program content, program guide data, and advertising content to multiple subscribers (e.g., the television-based client systems 404(1-N)). The content provider 402 can be implemented as a satellite operator, a network television operator, a cable operator, and the like to control distribution of program and advertising content, such as movies, television programs, commercials, music, and other audio, video, and/or image content to the client systems 404(1-N).

Content provider 402 includes a subscriber manager 422, a device monitor 424, an advertising manager 426, and a content server 428 (also referred to as an "edge server"). Although the various managers, servers, and monitors of content provider 402 (to include the acquisition server 412 in one embodiment) are illustrated and described as distributed, independent components of content provider 402, any one or more of the managers, servers, and monitors can be implemented together as a multi-functional component of content provider 402.

The subscriber manager 422 manages subscriber data, and the device monitor 424 monitors the client systems 404(1-N) (e.g., and the subscribers) and maintains the monitored client state information 200 described with reference to FIG. 2. The real-time state of a client device of a television-based system 404 can be monitored and managed by the device monitor 424 in a regular interval, such as every fifteen seconds, for example. In an embodiment, the client device monitoring is a pull-based implementation initiated by the device monitor 424.

The advertising manager 426 implements various features and embodiments of television system targeted advertising. For example, the advertising manager 426 caches, or otherwise batches, the advertising content for delivery to the television-based systems 404(1-N). The advertising manager 426 also maintains the advertising content delivery criteria 300 described with reference to FIG. 3 and other filters to deliver the advertising content to the television-based systems 404(1-N).

The television-based client systems 404(1-N) can be implemented with any number and combination of differing components as further described below with reference to the exemplary computing and/or client device 900 shown in FIG. 9. In this example, the television-based client systems 404(1-N) can be implemented to include a client device 110 and a display device 112 (e.g., a television) as described with reference to a television-based client system 104 shown in FIG. 1. Additionally, a client device 110 of a television-based client system 404 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system.

A particular client device 110 of a television-based client system 404 can be coupled to any number of televisions 112 and/or similar devices that can be implemented to display or otherwise render program content for television system targeted advertising. Similarly, any number of the client devices 110 of the respective client systems 404(1-N) can be coupled to a single television 112. In an alternate embodiment, client system 404(N) is implemented with a computing device 430 as well as a client device 110.

Methods for television system targeted advertising, such as exemplary methods 500, 600, and 700 described with reference to respective FIGS. 5, 6, and 7 may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
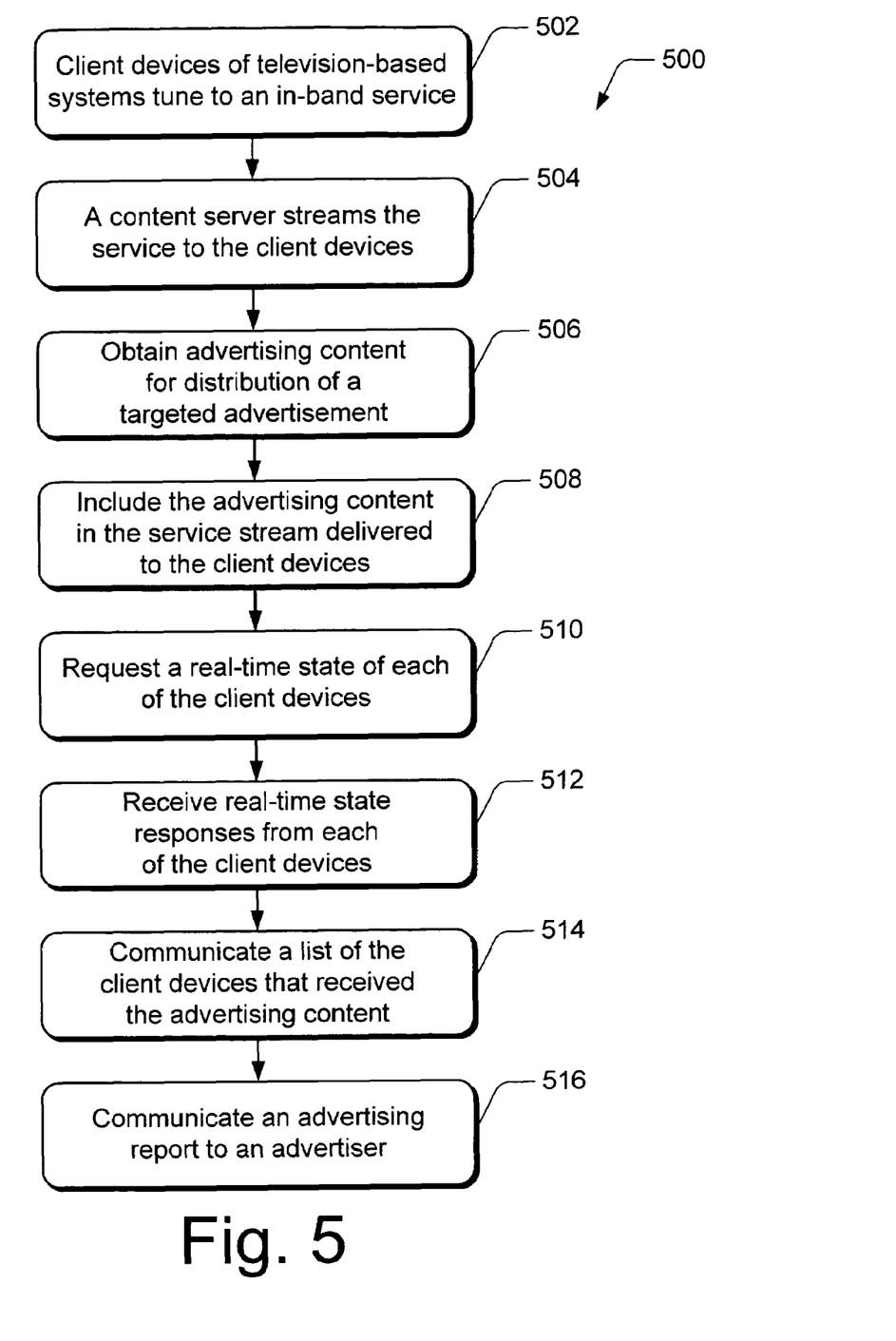
FIG. 5 is a flow diagram that illustrates an exemplary method for advertising content delivery via an in-band transport of a broadcast network for television system targeted advertising.

FIG. 5 illustrates an exemplary method 500 for advertising content delivery via an in-band transport of a broadcast network for television system targeted advertising. The order in which the method is described is not intended to be construed as a limitation, and any number of the described method blocks can be combined in any order to implement the method. Furthermore, the method can be implemented in any suitable hardware, software, firmware, or combination thereof.

At block 502, client devices of television-based systems tune to an in-band service (e.g., tune to an in-band channel to receive broadcast program content). At block 504, a content server streams the service to the client devices. For example, one or more client devices 110 of the respective television-based systems 404(1-N) tune to an in-band channel to receive broadcast program content from content provider 402 via the broadcast network 408.

At block 506, advertising content is obtained for distribution of a targeted advertisement to the client devices. For example, the advertising manager 426 of content provider 402 obtains advertising content from the acquisition server 412. At block 508, the advertising content is included in the service stream that is delivered to the client devices. For example, the advertising manager 426 includes the advertising content in the service stream (e.g., the in-band broadcast channel), and the content server 428 streams the service with the included advertising content to the client devices of the respective television-based systems 404(1-N).

At block 510, a real-time state of the client devices is requested to determine which of the client devices are tuned to receive the service and the advertising content. For example, the device monitor 424 of content provider 402 requests a real-time state from the client devices 110 of the respective television-based systems 404(1-N) to determine which of the client devices 110 are powered-on and configured to receive the advertising content via the in-band communication link (e.g., an in-band transport).

At block 512, real-time state responses are received from each of the client devices. For example, the device monitor 424 receives the real-time state responses from the client devices 110 of the respective television-based systems 404(1-N). At block 514, a list of the client devices that receive the advertising content is communicated to the advertising manager. For example, the device monitor 424 communicates to the advertising manager 426 a list of one or more client devices 110 of the respective television-based systems 404(1-N) that were powered-on and configured to receive the advertising content via the in-band communication link.

At block 516, an advertising report is communicated to an advertiser. For example, the advertising manager 426 communicates an advertisement impressions report to an advertiser 418 from which the advertiser 418 can determine how many of the client devices received the advertising content and how many of the client devices displayed the targeted advertisement for viewing.

Figure 6:
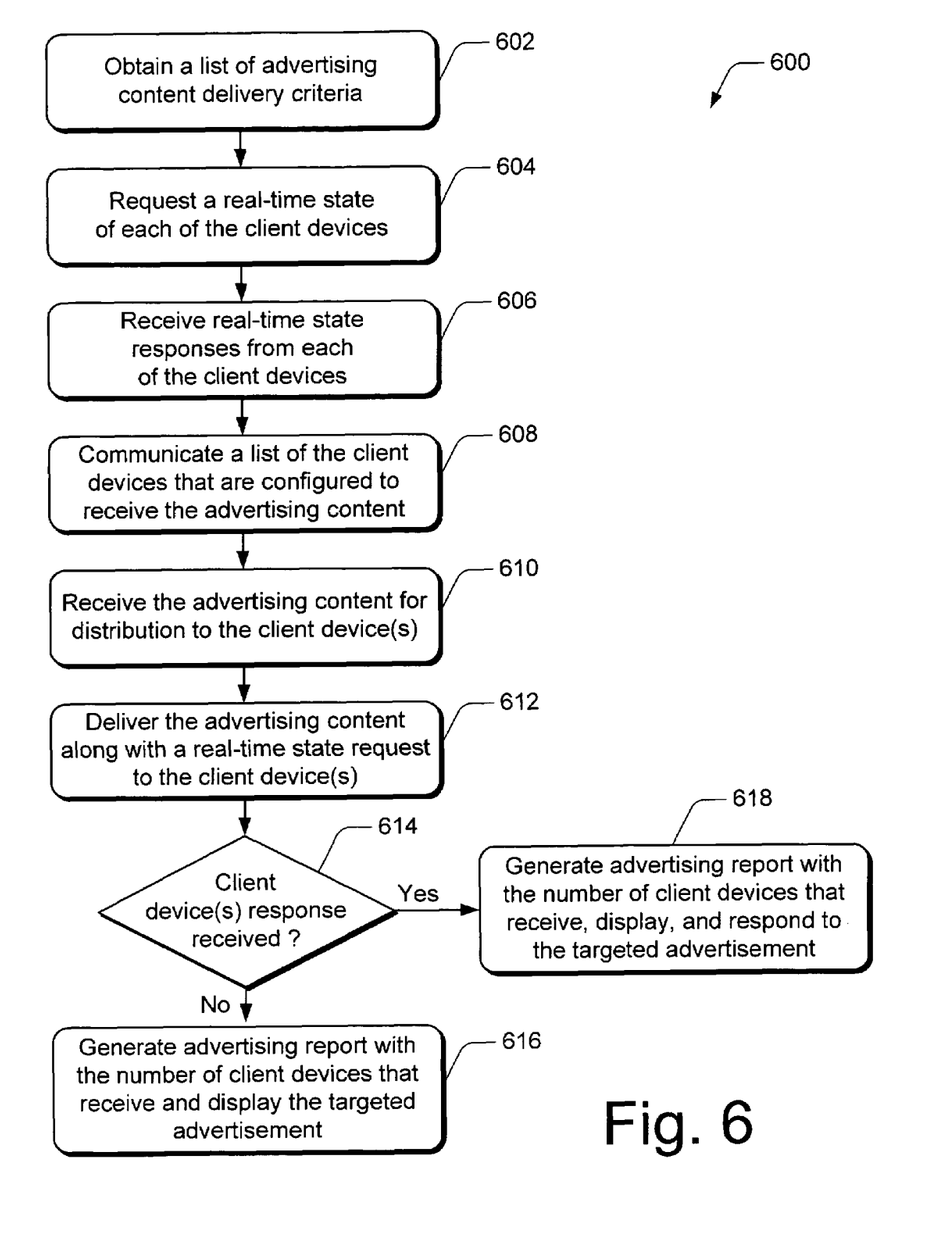
FIG. 6 is a flow diagram that illustrates an exemplary method for advertising content delivery via an out-of-band transport of a broadcast network for television system targeted advertising.

FIG. 6 illustrates an exemplary method 600 for advertising content delivery via an out-of-band transport of a broadcast network for television system targeted advertising. The order in which the method is described is not intended to be construed as a limitation, and any number of the described method blocks can be combined in any order to implement the method. Furthermore, the method can be implemented in any suitable hardware, software, firmware, or combination thereof.

At block 602, a list of advertising content delivery criteria is obtained. For example, acquisition server 412 receives advertising content and the criteria for delivering the advertising content from the advertisement source 418. Additionally, the device monitor 424 receives a list of the advertising content delivery criteria 300 (FIG. 3) from the advertising manager 426.

At block 604, a real-time state of the client devices is requested to determine which of the client devices are tuned to receive the advertising content. For example, the device monitor 424 of content provider 402 requests a real-time state from the client devices 110 of the respective television-based systems 404(1-N) to determine which of the client devices 110 are powered-on and configured to receive the advertising content via an out-of-band communication link (e.g., an out-of-band transport).

At block 606, real-time state responses are received from the client devices. For example, the device monitor 424 receives the real-time state responses from the client devices 110 of the respective television-based systems 404(1-N). At block 608, a list of the client devices that are configured to receive the advertising content is communicated to the advertising manager. For example, the device monitor 424 communicates to the advertising manager 426 a list of the client devices 110 of the respective television-based systems 404 (1-N) that are powered-on and configured to receive the advertising content via the out-of-band communication link.

At block 610, the advertising content is received for distribution to the client device(s) that are configured to receive the advertising content. For example, the device monitor 424 receives the advertising content from the advertising manager 426. At block 612, the advertising content is delivered to the client device(s) that are configured to receive the advertising content along with a real-time state request via the out-of-band communication link. For example, the device monitor 624 again requests a real-time state from the client devices 110 of the respective television-based systems 404(1-N) and delivers the advertising content to the client devices 110 along with the real-time state requests. The advertising content is delivered such that the receiving client devices 110 display the targeted advertisement for viewing.

At block 614, a determination is made as to whether one or more of the client devices initiate a response to the targeted advertisement. For example, a viewer at a television-based system 404 may respond (e.g., via a client device 110) to a targeted advertisement, and the response is received by content provider 402. If a client device response is not received (i.e., no from block 614), then an advertising report with targeted advertisement impression data is generated at block 616 to include the number of client devices that received the advertising content, and the number client devices that displayed the targeted advertisement for viewing.

If client device response(s) are received (i.e., yes from block 614), then an advertising report with targeted advertisement impression data is generated at block 618 to include the number of client devices that received the advertisement content, the number client devices that displayed the targeted advertisement for viewing, and the number of responses received from the client device(s). For example, a list of the client devices 110 of the respective television-based systems 404(1-N) that received the advertising content, displayed the targeted advertising, and/or responded to the targeted advertisement, is communicated to the advertising manager 426 which generates the advertising report.

Figure 7:
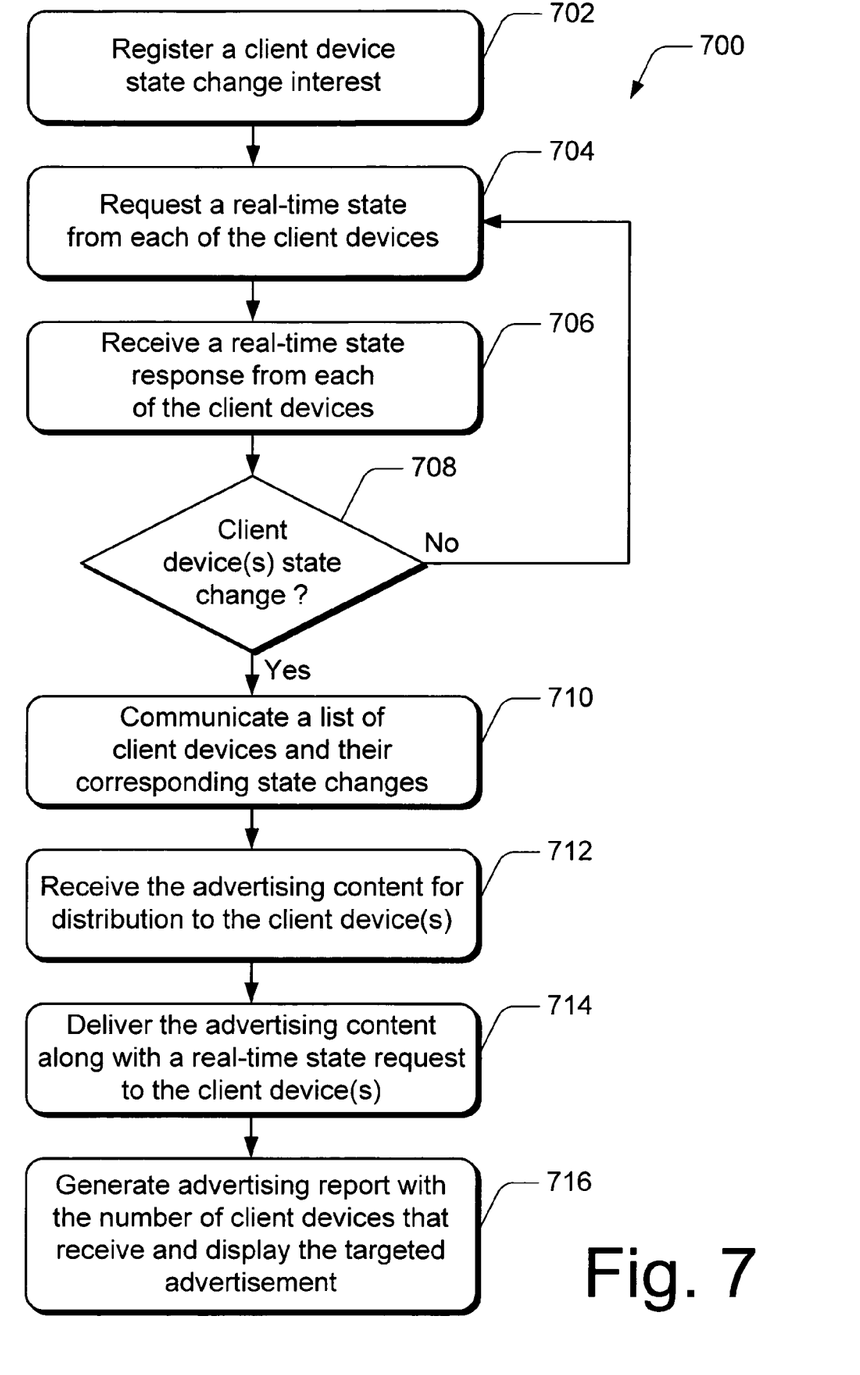
FIG. 7 is a flow diagram that illustrates an exemplary method for on-demand advertising content delivery via an out-of-band transport of a broadcast network for television system targeted advertising.

FIG. 7 illustrates an exemplary method 700 for on-demand advertising content delivery via an out-of-band transport of a broadcast network for television system targeted advertising. The order in which the method is described is not intended to be construed as a limitation, and any number of the described method blocks can be combined in any order to implement the method. Furthermore, the method can be implemented in any suitable hardware, software, firmware, or combination thereof.

At block 702, a client device state change interest is registered. For example, the device monitor 424 of content provider 402 receives and registers a state change indication from the advertising manager 426. At block 704, a real-time state of the client devices is requested. For example, the device monitor 424 of content provider 402 requests a real-time state from the client devices 110 of the respective television-based systems 404(1-N).

At block 706, real-time state responses are received from the client devices. For example, the device monitor 424 receives a real-time state response from each of the client devices 110 of the respective television-based systems 404 (1-N). At block 708, a determination is made as to whether a state of client device(s) has changed. For example, the device monitor 424 compares a previous client device state to a subsequent client device state to determine whether a state of the client device has changed, such as a monitored client state 202 (FIG. 2).

If a state of the client device(s) has not changed (i.e., no from block 708), then the method continues at block 704 to monitor the real-time state of each of the client devices. If a state of the client device(s) has changed (i.e., yes from block 708), then a list of the client devices with their corresponding state changes is communicated at block 710. For example, the device monitor 424 communicates a list of client devices that are determined to have had a state change to the advertising manager 426.

At block 712, the advertising content is received for distribution to the client device(s) that are detected having a state change. For example, the device monitor 424 receives the advertising content from the advertising manager 426. At block 714, the advertising content is delivered to the client device(s) along with a real-time state request via the out-of-band communication link. For example, the device monitor 424 again requests a real-time state from the client devices 110 of the respective television-based systems 404(1-N) and delivers the advertising content to the client devices 110 along with the real-time state requests. The advertising content is delivered such that the receiving client devices 110 display the targeted advertisement for viewing.

At block 716, an advertising report with targeted advertisement impression data is generated to include the number of client devices that received the advertising content, and the number client devices that displayed the targeted advertisement for viewing. For example, a list of the client devices 110 of the respective television-based systems 404(1-N) that received the advertising content and displayed the targeted advertising is communicated to the advertising manager 426 which generates the advertising report.

Figure 8:
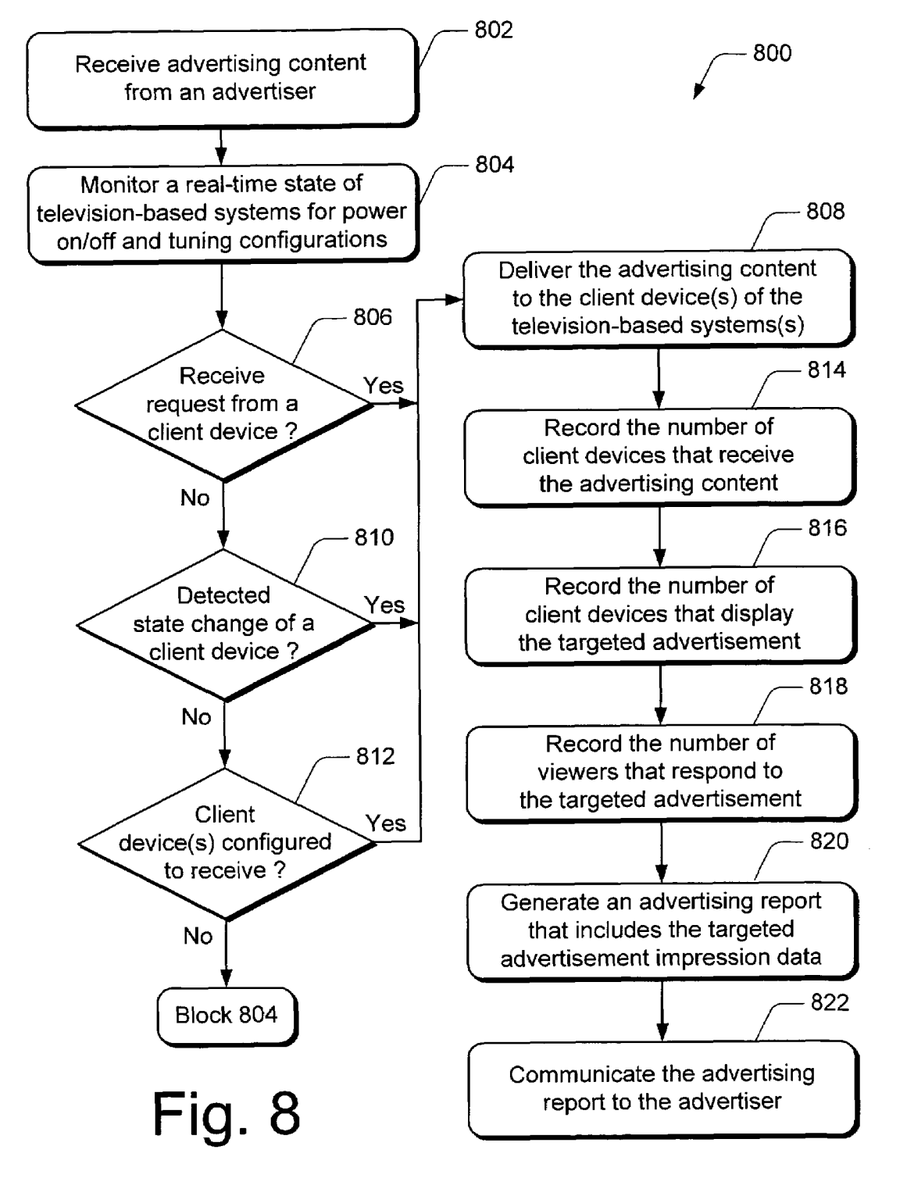
FIG. 8 is a flow diagram that illustrates an exemplary method for television system targeted advertising.

FIG. 8 illustrates an exemplary method 800 for television system targeted advertising. The order in which the method is described is not intended to be construed as a limitation, and any number of the described method blocks can be combined in any order to implement the method. Furthermore, the method can be implemented in any suitable hardware, software, firmware, or combination thereof.

At block 802, advertising content is received from an advertiser. For example, content provider 102 receives advertising content from an advertiser 114 (FIG. 1). At block 804, a real-time state of television-based systems is monitored for at least a power on/off state and a tuning configuration. For example, content provider 102 communicates a system state request to each of the client devices 110(1-N) of the respective television-based systems 104(1-N) via the IP-based network 106 to monitor the real-time state of the client devices.

At block 806, a determination is made as to whether a request to receive advertising content is received from a client device. For example, a client device 110 of a television-based system may communicate a request to receive advertising content to the content provider 102. If a request for advertising content is received (i.e., yes from block 806), then the requested advertising content is delivered to the requesting client device at block 808. The advertising content is delivered such that the requesting client device 110 displays the targeted advertisement for viewing.

The method otherwise continues (i.e., no from block 806) at block 810 where a determination is made as to whether a state change of a client device is detected. For example, a viewer at a client device 110 of a television-based system may change channels or initiate the program guide, in which case the content provider 102 detects the state change of the client device. If a state change is detected (i.e., yes from block 810), then the advertising content is delivered to the client device based on the detected state change at block 808 if the state change corresponds to advertising content delivery criteria 300 (FIG. 3). For example, content provider 102 delivers the advertising content to a client device 110 of a television-based system 104 if state change is detected at the client device. The advertising content is delivered such that the client device 110 displays the targeted advertisement for viewing.

The method otherwise continues (i.e., no from block 810) at block 812 where a determination is made as to whether one or more of the client devices are powered-on and tuned, or otherwise configured, to receive the advertising content. If the one or more client devices are configured to receive the advertising content (i.e., yes from block 812), then the advertising content is delivered to the client devices that are determined to be powered-on and tuned to receive the advertising content (or that are otherwise configured to receive the advertising content) at block 808.

The advertising content can be delivered from content provider 102 to the one or more client devices 110(1-N) of the respective television-based systems 104(1-N) via an in-band communication link (e.g., an in-band transport), via an out-of-band communication link (e.g., an out-of-band transport), or can be delivered along with a system state request at block 804. The advertising content is delivered to the one or more client devices of the respective television-based systems at block 808 when the client devices are powered-on and tuned to receive the advertising content, or are otherwise configured to receive the advertising content. Additionally, the advertising content can be delivered at block 808 based on a scheduled date, a scheduled time, or based on a scheduled recursive interval.

At block 814, the number of client devices that receive the advertising content is recorded. At block 816, the number of client devices that display the targeted advertisement for viewing is recorded. At block 818, the number of viewers that respond to the targeted advertisement (via a client device) is recorded. For example, the content provider 102 records how many of the television-based systems 104(1-N) receive the advertising content, how many of the television-based systems 104(1-N) that receive the advertising content then display the targeted advertisement for viewing, and how many of the television-based systems 104(1-N) that receive the advertising content and display the targeted advertisement for viewing then initiate a response to the targeted advertisement.

At block 820, an advertising report is generated that includes how many of the client devices receive the advertising content, how many of the client devices display the targeted advertisement for viewing, and/or includes how many of the viewers (e.g., via a client device) initiate a response to the targeted advertisement. At block 822, the advertising report is communicated to the advertiser. For example, content provider 102 generates an advertising report with the targeted advertisement impression data, and communicates the advertising report to the advertiser 114.

Figure 9:
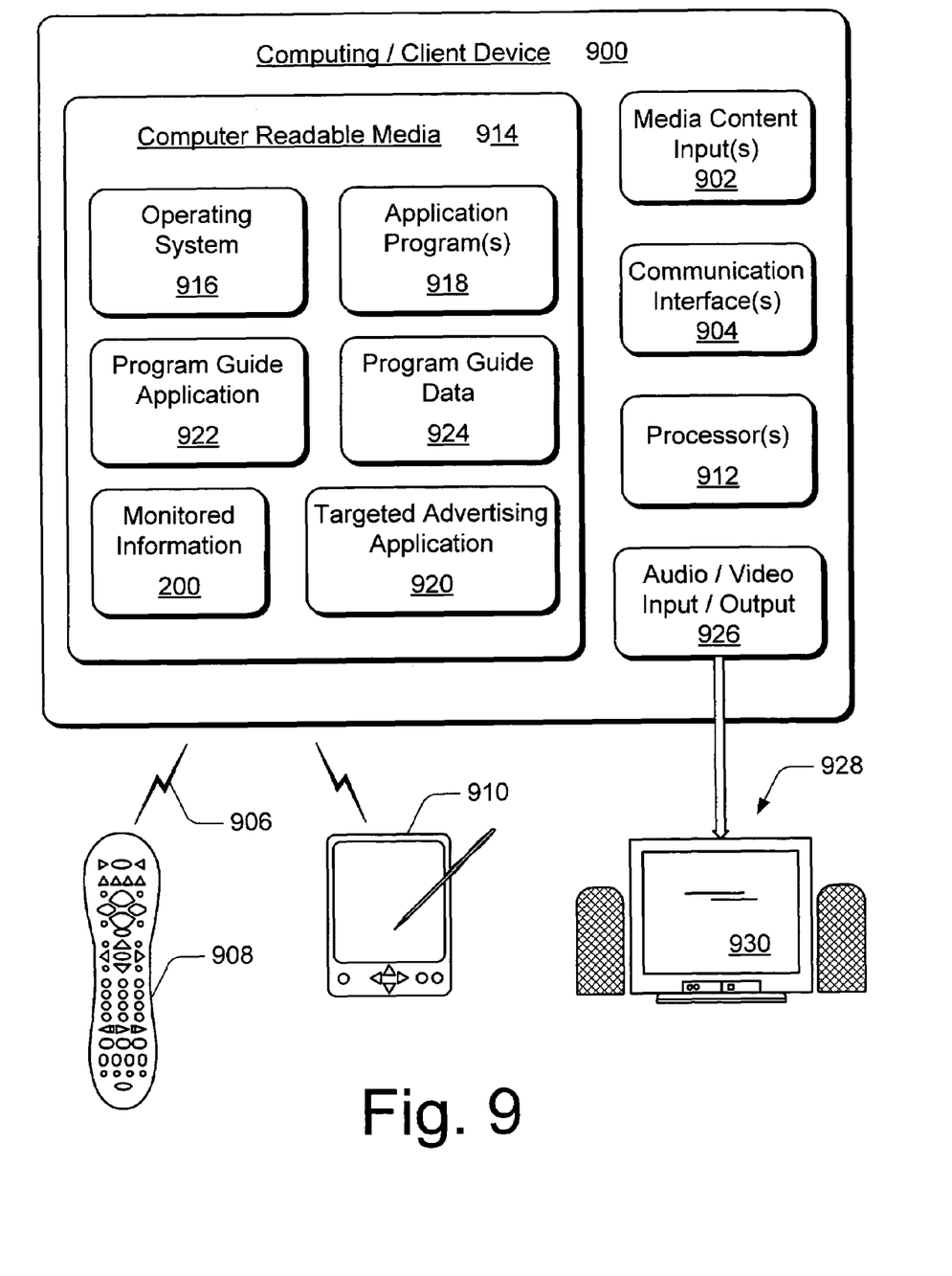
FIG. 9 illustrates various components of an exemplary computing and/or client device that can be implemented as any one or more of the television-based system components and devices shown in FIG. 1, and/or as the various devices and components in the television environment shown in FIG. 4.

FIG. 9 illustrates various components of an exemplary computing and/or client device 900 in which embodiments of television system targeted advertising can be implemented. Further, the computing and/or client device 900 can be implemented as computing device 430 (FIG. 4), as any one or more of the client devices 110 described with reference to FIGS. 1 and 4, and as any one or more of the servers, monitors, and managers of content provider 402 described with reference to FIGS. 1 and 4. The device 900 can also be implemented as any form of computing or electronic device with any number and combination of differing components as described below with reference to the exemplary computing environment 1000 shown in FIG. 10.

Computing and/or client device 900 includes one or more media content inputs 902 which may include Internet Protocol (IP) inputs over which streams of media content are received via an IP-based network. Device 900 further includes communication interface(s) 904 which can be implemented as any one or more of a serial and/or parallel interface, a wireless interface, any type of network interface, a modem, and as any other type of communication interface. A wireless interface enables device 900 to receive control input commands 906 and other information from an input device, such as from remote control device 908, PDA (personal digital assistant) 910, cellular phone, or from another infrared (IR), 802.11, Bluetooth, or similar RF input device.

A network interface provides a connection between the computing and/or client device 900 and a communication network (e.g., networks 106 and 406 shown in respective FIGS. 1 and 4) by which other electronic and computing devices can communicate data with device 900. Similarly, a serial and/or parallel interface provides for data communication directly between device 900 and the other electronic or computing devices. A modem facilitates device 900 communication with other electronic and computing devices via a conventional telephone line, a DSL connection, cable, and/or other type of connection.

Computing and/or client device 900 also includes one or more processors 912 (e.g., any of microprocessors, controllers, and the like) which process various computer executable instructions to control the operation of device 900, to communicate with other electronic and computing devices, and to implement embodiments of television system targeted advertising. Device 900 can be implemented with computer readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 914 provides data storage mechanisms to store various information and/or data such as software applications and any other types of information and data related to operational aspects of the computing and/or client device 900. For example, an operating system 916 and/or other application programs 918 can be maintained as software applications with the computer readable media 914 and executed on processor(s) 912 to implement embodiments of television system targeted advertising.

For example, when device 900 is implemented as a content provider 102 (FIG. 1) or 402 (FIG. 4) and/or as an advertising manager 426, computer readable media 914 maintains the monitored client state information 200 shown in FIG. 2, and maintains a targeted advertising application 920 to implement embodiments of television system targeted advertising. Although the targeted advertising application 920 is illustrated and described as a single application configured to implement embodiments of television system targeted advertising, the targeted advertising application 920 can be implemented as several component applications distributed to each perform one or more functions in a client device in a television-based entertainment and information system.

The computer readable media 914 also includes a program guide application 922 that is implemented to process program guide data 924 and generate program guides for display which enable a viewer to navigate through an onscreen display and locate broadcast programs, recorded programs, video on-demand programs and movies, interactive game selections, and other media access information or content of interest to the viewer.

The computing and/or client device 900 also includes an audio and/or video output 926 that provides audio and video to an audio rendering and/or display system 928, or to other devices that process, display, and/or otherwise render audio, video, and display data. Video signals and audio signals can be communicated from device 900 to television 930 via an RF (radio frequency) link, S-video link, composite video link, component video link, analog audio connection, or other similar communication link.

Figure 10:
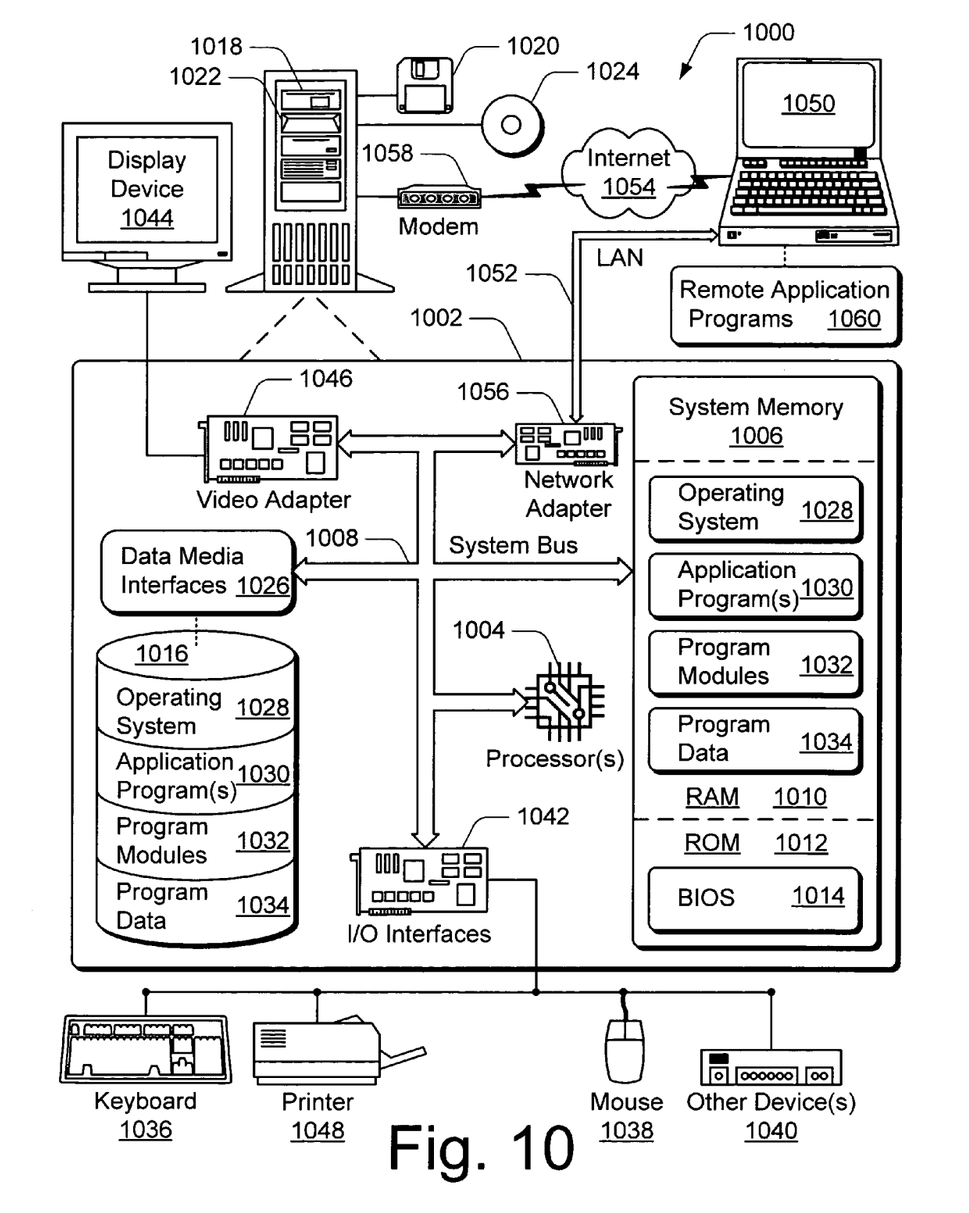
FIG. 10 illustrates exemplary computing systems, devices, and components in an environment that television system targeted advertising can be implemented.

FIG. 10 illustrates an exemplary computing environment 1000 within which television system targeted advertising systems and methods, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on RAM 1010, ROM 1012, hard disk 1016, magnetic disk 1020, and/or optical disk 1024, including by way of example, an operating system 1028, one or more application programs 1030, other program modules 1032, and program data 1034. Each of such operating system 1028, application program(s) 1030, other program modules 1032, program data 1034, or any combination thereof, may include one or more embodiments of the systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1002 via any number of different input devices such as a keyboard 1036 and pointing device 1038 (e.g., a "mouse"). Other input devices 1040 (not shown specifically) may include a microphone, joystick, game pad, controller, satellite dish, serial port, scanner, and/or the like. These and other input devices are connected to the processors 1004 via input/output interfaces 1042 that are coupled to the system bus 1008, but may be connected by other interface and bus structures, such as a parallel port, game port, and/or a universal serial bus (USB).

A display device 1044 (or other type of monitor) can be connected to the system bus 1008 via an interface, such as a video adapter 1046. In addition to the display device 1044, other output peripheral devices can include components such as speakers (not shown) and a printer 1048 which can be connected to computing device 1002 via the input/output interfaces 1042.

Computing device 1002 can operate in a networked environment using logical connections to one or more remote computers, such as remote computing device 1050. By way of example, remote computing device 1050 can be a personal computer, portable computer, a server, a router, a network computer, a peer device or other common network node, and the like. The remote computing device 1050 is illustrated as a portable computer that can include any number and combination of the different components, elements, and features described herein relative to computing device 1002.

Logical connections between computing device 1002 and the remote computing device 1050 are depicted as a local area network (LAN) 1052 and a general wide area network (WAN) 1054. Such networking environments are commonplace in offices, enterprise-wide computer networks, intranets, and the Internet. When implemented in a LAN networking environment, the computing device 1002 is connected to a local network 1052 via a network interface or adapter 1056. When implemented in a WAN networking environment, the computing device 1002 typically includes a modem 1058 or other means for establishing communications over the wide area network 1054. The modem 1058 can be internal or external to computing device 1002, and can be connected to the system bus 1008 via the input/output interfaces 1042 or other appropriate mechanisms. The illustrated network connections are merely exemplary and other means of establishing communication link(s) between the computing devices 1002 and 1050 can be utilized.

In a networked environment, such as that illustrated with computing environment 1000, program modules depicted relative to the computing device 1002, or portions thereof, may be stored in a remote memory storage device. By way of example, remote application programs 1060 are maintained with a memory device of remote computing device 1050. For purposes of illustration, application programs and other executable program components, such as operating system 1028, are illustrated herein as discrete blocks, although it is recognized that such programs and components reside at various times in different storage components of the computing device 1002, and are executed by the one or more processors 1004 of the computing device 1002.

Although embodiments of television system targeted advertising have been described in language specific to structural features and/or methods, it is to be understood that the subject of the appended claims is not necessarily limited to the specific features or methods described. Rather, the specific features and methods are disclosed as exemplary implementations of television system targeted advertising.

The invention claimed is:

1. A targeted advertising system, the system comprising:
   a device monitor configured to:
   maintain a real-time state of each television-based device of a plurality of television-based devices, the each television-based device of the plurality of television-based devices being configured to receive advertising content to display a targeted advertisement for viewing, wherein the real-time state of a subject television-based device comprises:
   a power state indicating one of at least three real-time power states of the subject television-based device, the at least three real-time power states including power-on, power-off, and standby;
   a tuning configuration;
   a display mode state indicating one of real-time display mode states of the subject television-based device, the real-time display mode states comprising a program guide, a search screen, a full screen, a picture-in-picture, a full screen and picture-in-picture combination, and any combination thereof;
   a subsystem activity state indicating one of real-time subsystem activity states of the subject television-based device, the real-time subsystem activity states comprising displaying a live programming, displaying an on-demand video, displaying a recorded program via a DVR, displaying a gaming application, and any combination thereof;

an inactivity duration indicating whether a viewer is or is not present and watching the subject television-based device by one of detected indications, the six detected indications comprising a screen saver being initiated, a channel change input, a program guide viewing input, a gaming input, a communication input, and a voice-based input;

record how many of the plurality of the television-based devices receive the advertising content;

record how many of the plurality of the television-based devices that receive the advertising content then display the targeted advertisement for viewing; and record how many of the plurality of the television-based devices that receive the advertising content and display the targeted advertisement for viewing then initiate a response to the targeted advertisement; and an advertisement manager configured to initiate delivery of the advertising content to one or more of the plurality of the television-based devices when the one or more of the plurality of television-based devices are powered-on and tuned to receive the advertising content, wherein the advertisement manager is further configured to initiate delivery of the advertising content based on a detected change in the power state from either power-off or standby to power-on.

2. A targeted advertising system as recited in claim 1, wherein the device monitor is further configured to record how many of the plurality of the television-based devices receive the advertising content via an in-band communication link.

3. A targeted advertising system as recited in claim 1, wherein the device monitor is further configured to record how many of the plurality of the television-based devices receive the advertising content via an out-of-band communication link.

4. A targeted advertising system as recited in claim 1, wherein:
the device monitor is further configured to communicate a device state request to a television-based device via an IP-based network; and
the advertisement manager is further configured to initiate delivery of the advertising content to the television-based device along with the device state request.

5. A targeted advertising system as recited in claim 1, wherein the advertisement manager is further configured to initiate delivery of the advertising content to a television-based device when a state change of a client device of the television-based device is detected.

6. A targeted advertising system as recited in claim 1, wherein the advertisement manager is further configured to initiate delivery of the advertisement content to a television-based device in response to a request received from a client device of the television-based device.

7. A targeted advertising system as recited in claim 1, wherein the advertisement manager is further configured to:
receive the advertising content from an advertiser;
generate an advertising report that includes how many of the television-based devices receive the advertising content, and includes how many of the television-based devices display the targeted advertisement for viewing; and
communicate the advertising report to the advertiser.

8. A targeted advertising system comprising:
a device monitor configured to:
maintain a real-time state of each television-based device of a plurality of television-based devices, the each television-based device of the plurality of television-based devices being configured to receive advertising content to display a targeted advertisement for viewing, wherein the real-time state of a subject television-based device comprises:
a power state indicating one of at least three real-time power states of the subject television-based device, the at least three real-time power states including power-on, power-off, and standby;
a tuning configuration;
a display mode state indicating one of real-time display mode states of the subject television-based device, the real-time display mode states comprising a program guide, a search screen, a full screen, a picture-in-picture, a full screen and picture-in-picture combination, and any combination thereof;
a subsystem activity state indicating one of real-time subsystem activity states of the subject television-based device, the real-time subsystem activity states comprising displaying a live programming, displaying an on-demand video, displaying a recorded program via a DVR, displaying a gaming application, and any combination thereof;
an inactivity duration indicating whether a viewer is or is not present and watching the subject television-based device by one of detected indications, the six detected indications comprising a screen saver being initiated, a channel change input, a program guide viewing input, a gaming input, a communication input, and a voice-based input;
an advertisement manager configured to:
initiate delivery of the advertising content to the subject television-based device based on advertising content delivery criteria, wherein the advertising content delivery criteria comprise at least one or more of: a scheduled date, a scheduled time, a scheduled recursive interval, and a change in the real-time state of the subject television-based device corresponding to the advertising content delivery criteria.

9. A targeted advertising system as recited in claim 8, wherein the targeted advertisement is displayed as one of viewing modes, and wherein the viewing modes comprise a full screen display, a picture-in-picture window, an on-screen display, a ticker display, a static image, an audio message, and any combination thereof.

10. A targeted advertising system as recited in claim 8, wherein the device monitor is further configured to:
record how many of the plurality of the television-based devices receive the advertising content;
record how many of the plurality of the television-based devices that receive the advertising content then display the targeted advertisement for viewing; and
record how many of the plurality of the television-based devices that receive the advertising content and display the targeted advertisement for viewing then initiate a response to the targeted advertisement.

* * * * *